Figure 2:
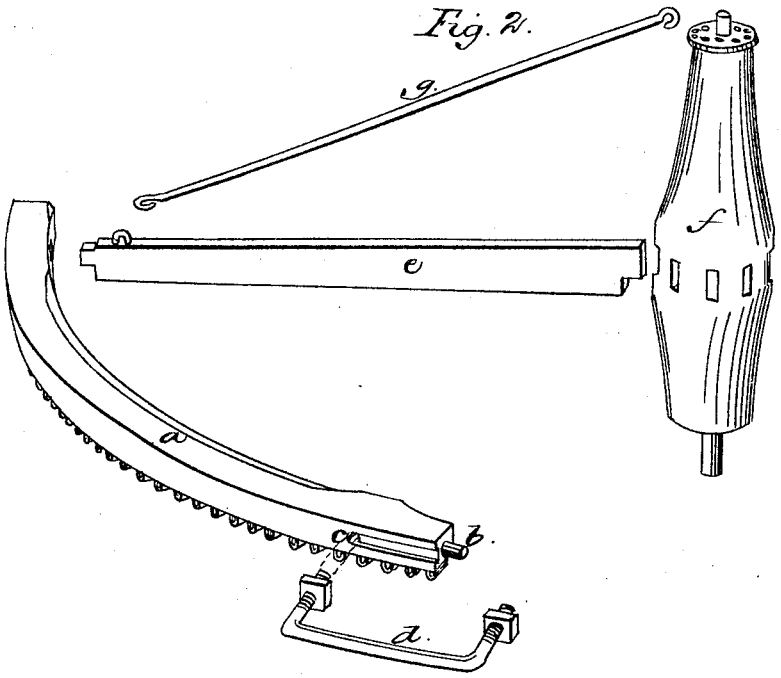

BEST AVAILABLE COPY

2 Sheets, Sheet 2.

J. A. Taylor,

Horse Power.

No 256. Reissued Jan. 24, 1854.

AM. PHOTO-LITHO. CO. N.Y. (OSBORNE'S PROCESS)

UNITED STATES PATENT OFFICE.

JOHN A. TAPLIN, OF FISHKILL, NEW YORK.

IMPROVEMENT IN PORTABLE HORSE-POWERS.

Specification forming part of Letters Patent No. 2,407, dated December 30, 1841; Reissue No. 256, dated January 24, 1854.

*To all whom it may concern:*

Be it known that I, JOHN A. TAPLIN, formerly of Hammond, in the county of Lawrence and State of New York, now of Fishkill, in the county of Dutchess and State aforesaid, have invented a new and useful Improvement in the Large or Master Wheel of Horse-Powers, of which the following is a full, clear, and exact description, reference being had to the accompanying drawings, which form part of this specification, and in which—

Figure 1 represents a view in perspective of a horse-power having one of my improved master-wheels attached thereto; and Fig. 2, like views of the shaft, an arm, a brace-rod, a segment, and segment-clamp, detached from the wheel, to show the details of their construction and the manner of connecting and disconnecting them, to render them so that the wheel may readily be taken apart and rendered compact to facilitate transportation, and then again put together readily and conveniently whenever it is required to set the wheel up and put it in operation.

By this method of constructing the wheel in sections all the advantages in construction and working of the largest wheels are combined with the convenient portability of smaller ones.

I construct the rim of my wheel, of any of the known forms, in two or more sections or segments, *a*, the end of each of which I unite by dowel-pins *b*, to hold them from slipping. About six inches from the ends I have a hole, *c*, to receive the legs of the clamps *d*, which must be inserted from the outside of the rim or segment. The purpose of these clamps is to hold the segments firmly in place when put together, and as they may be easily removed the rim can be conveniently taken to pieces, and thus rendered portable. Each of the segments is in this instance supported on the outer extremity of two arms, *e*, the latter having tenons which fit into corresponding mortises in the inner periphery of the segment. The inner extremity of each of the arms *e* is in like manner attached by a tenon to a central shaft, the relative sizes of the tenons and mortises being such that they will fit together well and yet be easily taken apart. The outer end of each arm is supported from the top of the shaft *f* by a rod, *g*, which hooks into a staple eyebolt or other suitable connection in each. The lower end of the shaft *f* of the wheel is fitted with a suitable bearing, which rests in a step secured to a pair of crossed arms, *h*. The outer extremities of these arms support standards *i*, near whose upper ends two pulleys are pivoted, the lower, *j*, to support the lower side of the rim, and the upper, *k*, to hold the rim down upon the lower pulley. One of the standards, in lieu of a lower pulley, is fitted with a pinion, *l*, the shaft *m* of which extends through the standard and carries a grooved pulley to transmit motion through a band to any machinery it is desired to move. The arms *h* and standards *i* are united in such manner that they can be easily taken apart to facilitate removal and transportation. The lower side of the sectional rim *a* has cogged segments secured thereto in such manner that the pinion *l* matches therein to receive motion therefrom.

I do not claim as my invention the making of the large wheel of a horse-power in segments, merely; but What I do claim as my invention, and desire to secure by Letters Patent, is—

1. Such a wheel and axle composed of a number of parts arranged and connected substantially in the method herein described, so that the wheel can readily be taken apart and put together again, to facilitate the frequent removal of the horse-power from place to place to bring it near the work on which it is to be used.

2. Connecting the segments of the rim of the horse-power by means of clamps constructed as herein set forth.

In testimony whereof I have hereunto subscribed my name.

JOHN A. TAPLIN.

Witnesses:

NORRIS BAXTEN,

P. H. WATSON.